United States Patent Office 3,258,034
Patented June 28, 1966

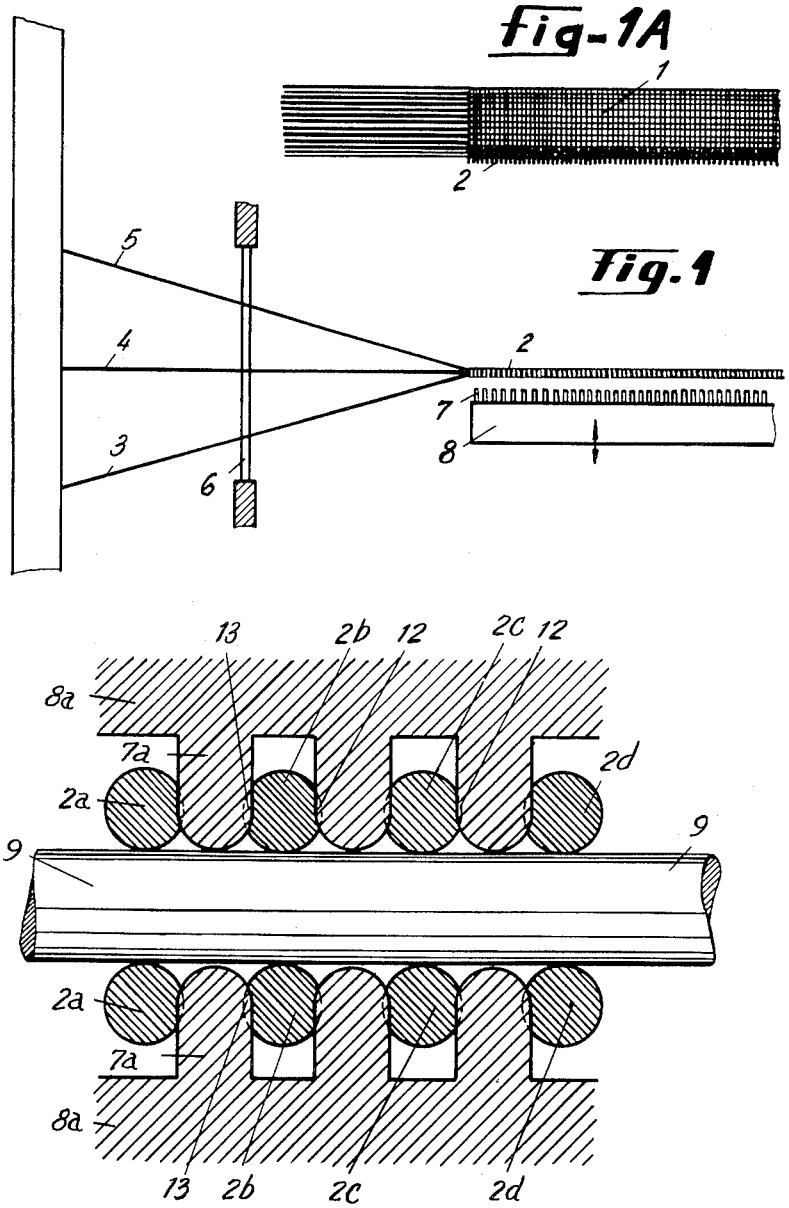

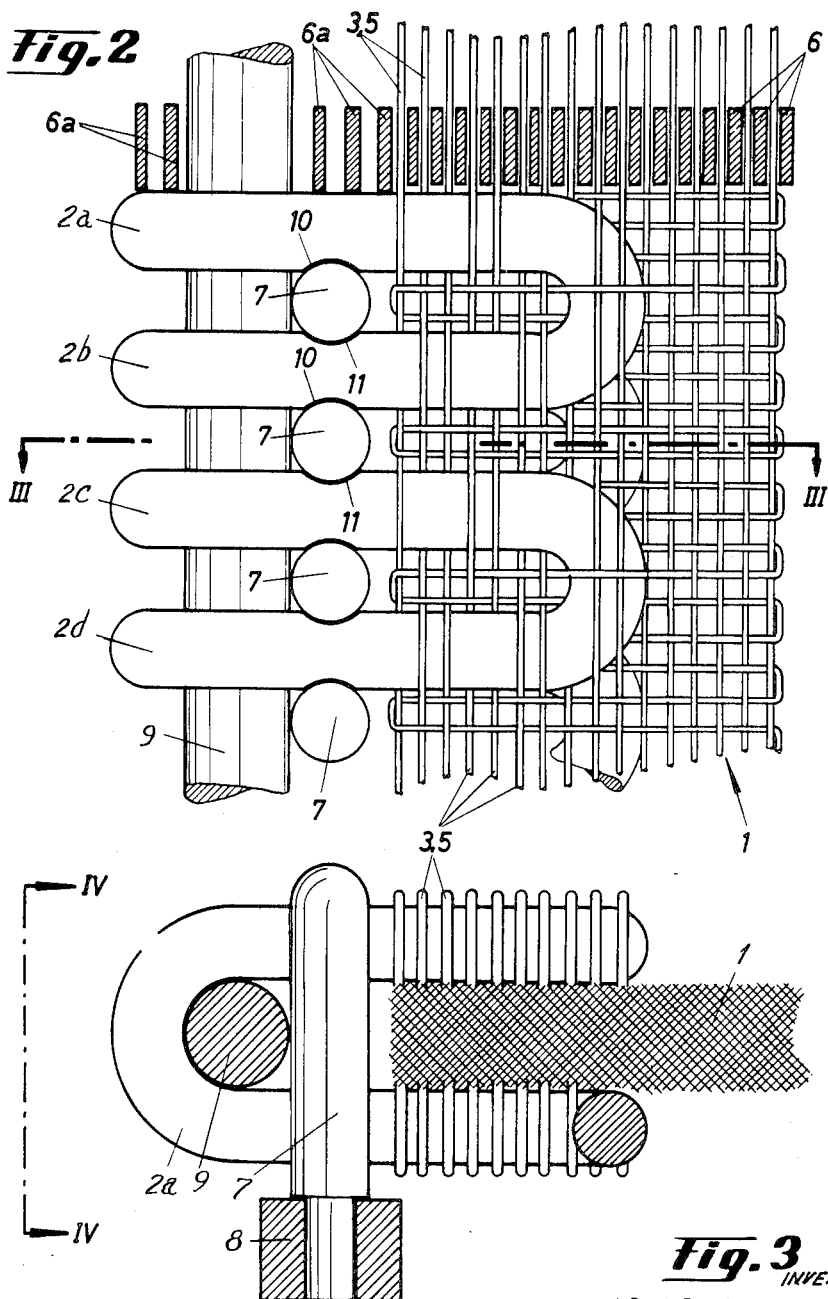

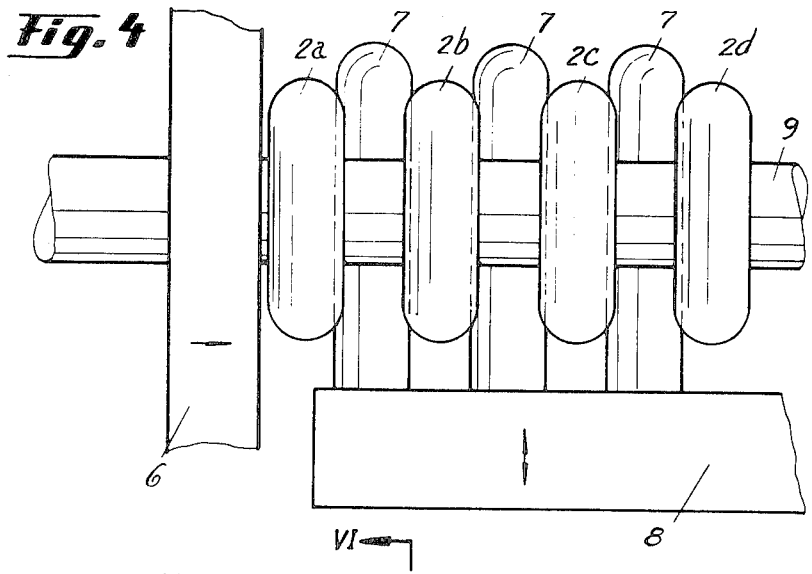
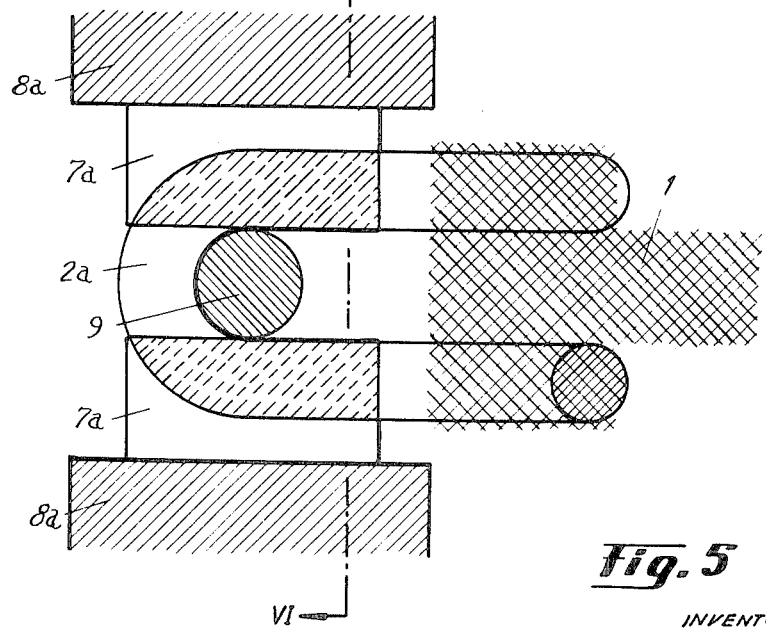

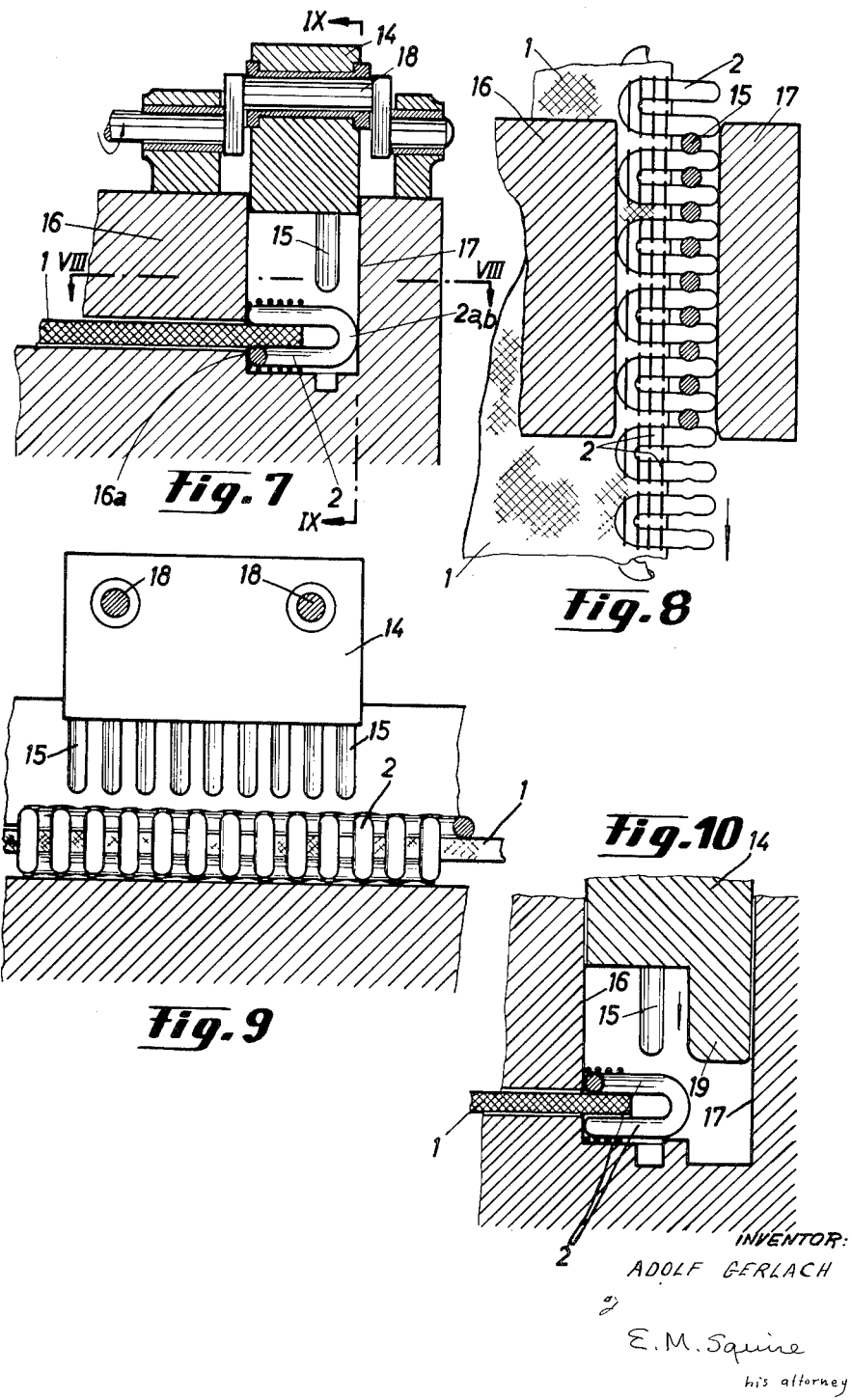

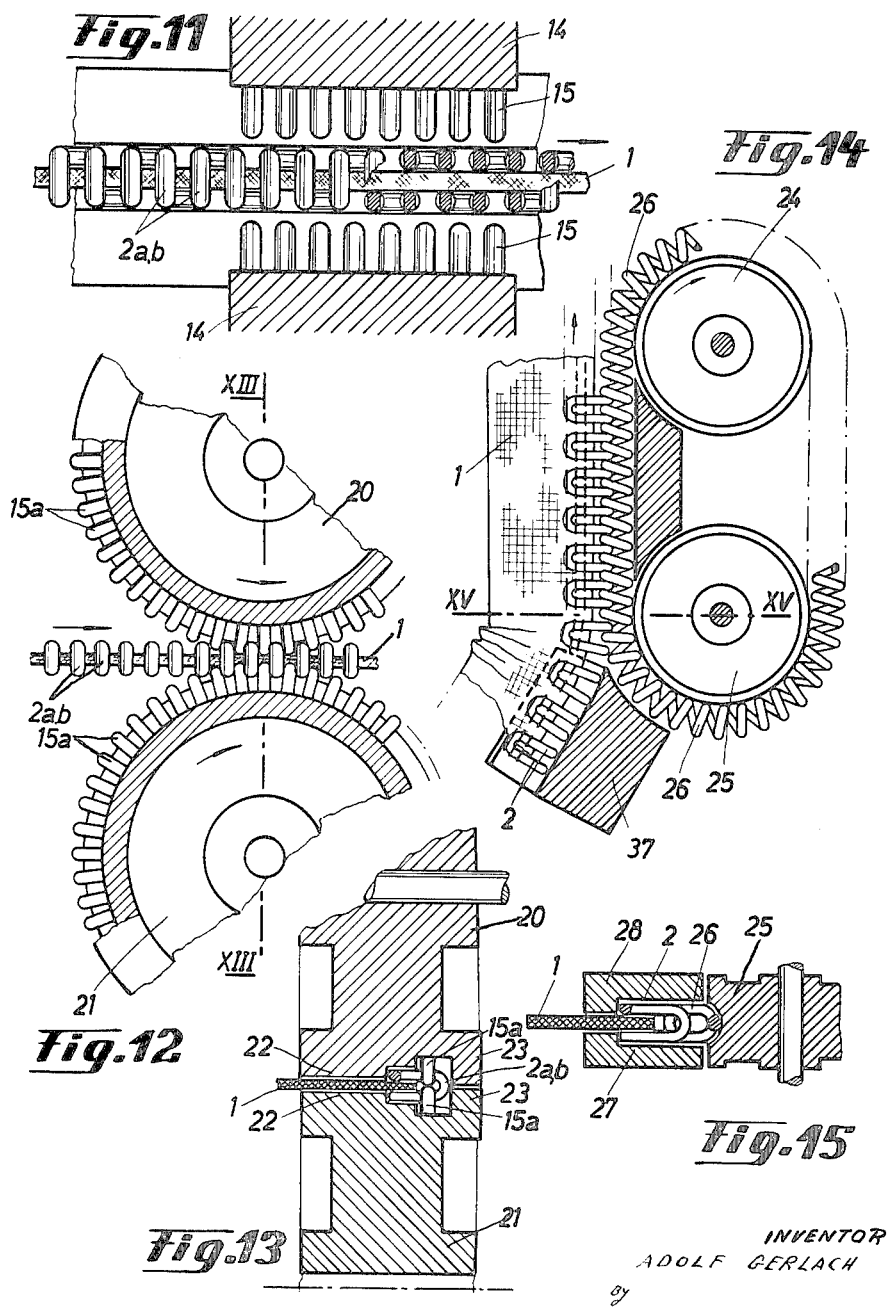

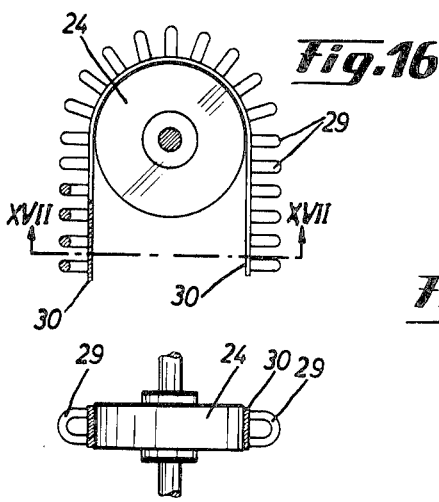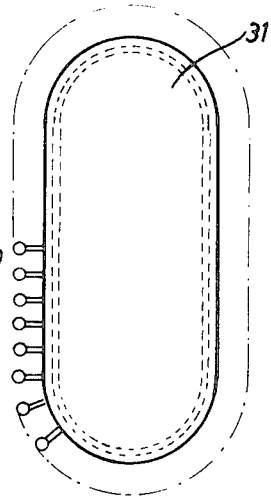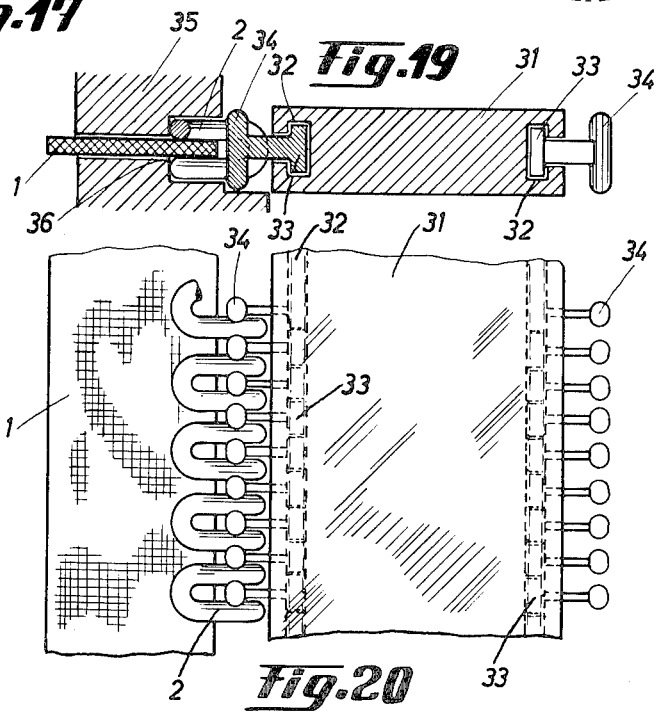

3,258,034
METHOD AND APPARATUS FOR MANUFACTURING WOVEN SLIDING CLASP FASTENERS
Adolf Gerlach, Wuppertal-Barmen, Germany, assignor to Novi Patentverwertungs G.m.b.H., Wuppertal-Barmen, Germany, a German body corporate
Filed Apr. 26, 1963, Ser. No. 276,010
Claims priority, application Germany, Apr. 26, 1962, N 21,497
10 Claims. (Cl. 139—11)

The present invention relates to methods for the shaping of the free end portions of the loops of a continuous permanently deformable plastic filament to form slide fastener teeth, the filament being interwoven into the selvage of the stringer tape of the slide fastener.

The steps of the method comprise the insertion of a series of forming members into a series of spaces between adjacent loops of the filament. The center spacing of the forming members is the same as the center spacing of the loops. The forming members, however, are of larger diameter or width in the direction of the selvage than the free space between adjacent loops so that indentations are formed in the filament by the forming members. These identations provide the shaping of the outer end portions of the loops so that they will operate as slide fastener teeth.

Pressure is caused to be applied to the loops with the forming members inserted in the spaces therebetween. The pressure may be applied during weaving by the beating action of the reed of the loom. It may also be applied by forcing the forming members into the spaces between the loops.

The forming members are withdrawn from a first series of spaces and inserted into a second series of spaces which includes a theretofore unoccupied space. This may be obtained by advancing the tape relative to the forming members through a distance equal to the uniform center spacing between the loops of the series. It may likewise be obtained by endless belt or rotating wheel arrangements wherein a forming member is withdrawn from an end space of the first series to form the second series which includes the theretofore unused space for the insertion of another forming member.

In order that the methods of the invention may be more clearly understood, reference will now be made to the accompanying drawings in which:

FIGURE 1 is a schematic diagram of a shed forming arrangement for weaving one-half of a sliding clasp fastener with a row of fastener elements formed by a continuous plastic filament interwoven into the selvage of the stringer tape, FIGURE 1A is a fragmentary plan view of a partially completed stringer tape showing the interwoven plastic filament, FIGURE 2 is a highly enlarged fragmentary sectional view of a sliding clasp fastener half in the process of being woven, showing a reed beater and the support of the free fastener member loops, FIGURE 3 is a section along the line III—III in FIGURE 2, FIGURE 4 is an elevation viewed in the direction of the arrows on the line IV—IV in FIGURE 3, FIGURE 5 is a section corresponding to FIGURE 3 with a modified bracing of the free fastener member loops, FIGURE 6 is a section along the line VI—VI in FIGURE 5, FIGURE 7 is a cross-section through a woven sliding clasp fastener half with a toothed comb for the creation of the coupling surfaces after weaving, FIGURE 8 is a section along the line VIII—VIII in FIGURE 7, FIGURE 9 is an elevation viewed in the direction of the arrows on the line IX—IX in FIGURE 7, FIGURE 10 is an enlarged partial cross-section of the embodiment shown in FIGURE 7, with a slightly modified toothed comb, FIGURE 11 is an enlarged section along the line IX—IX in FIGURE 7, but with a homologous arrangement of two toothed combs, FIGURE 12 is a longitudinal section through a disc-shaped toothed arrangement for the formation of the coupling surfaces on the free loops of the interwoven row of fastener members, FIGURE 13 is a greatly enlarged partial section along the line XIII—XIII in FIGURE 12, FIGURE 14 is a diagrammatic elevation of a woven sliding clasp fastener half with an endless chain of deforming elements, FIGURE 15 is an enlarged cross-section along the line XV—XV in FIGURE 14, FIGURE 16 is a partial elevation of an endless belt with deforming elements fastened to it, FIGURE 17 is a cross-section along the line XVII—XVII in FIGURE 16, FIGURE 18 is a diagrammatic elevation of a carrier support with individual laminated deforming members assembled into an endless row and inserted in its periphery and running around it, FIGURE 19 is an enlarged cross-section through the embodiment shown in FIGURE 18, the deforming members engaging in the free loops of the fastener members of a woven fastener half, and FIGURE 20 is a partial elevation of the embodiment shown in FIGURES 18 and 19.

Referring now to the drawings, a Jacquard tape loom operating with at least two shuttles is diagrammatically indicated in FIG. 1 and is used to carry out the method according to the invention, one of the said shuttles holding the spool of a textile weft or woof thread and the other shuttle holding the spool of a plastic weft or woof thread, e.g. a thermoplastic filament, the latter being interwoven into one of the selvages of the stringer tape 1 to form a row of fastener members 2 and forming free loops extending beyond transversely of the selvage of the tape 1 by virtue of the fact that the plastic weft thread is led around a fixed pin or wire which follows the movements of the shed-forming mechanism. In FIGURE 1, the warp threads 3 and 4 form the shed for the stringer tape 1 being woven and a side portion of the warp threads 3 together with the warp threads 5 form the shed for tying off the plastic filament. After the insertion of each weft thread, the weft threads are beaten in conventional manner by the reed 6 so as to form a compact fabric. When the plastic filaments are woven, they assume a generally serpentine configuration as described below.

In accordance with the invention, in order to be able to provide the free loops for the fastener members of the plastic filament, formed on one of the selvedge portions of the tape, a stud or forming member 7 is engaged between the last free end loop 2a and the loop 2b of the uniformly spaced series of loop 2a–2d as shown in FIGURES 2 to 4, this forming member 7 being engaged before the impact of the reed 6 (FIG. 2) against the fell of the fabric and acting as an abutment or support for the end loop 2a upon the impact of the reed 6. However it is better still to force a plurality of forming members 7 simultaneously into the series of free spaces between the adjacent loops of a series of loops 2a, 2b, 2c, etc., for example in the form of a series of rods 7 which are mounted on a common supporting member 8, the rods of forming members 7 being of round, oval or of other cross section and engaging between the longitudinally stationary wire 9 and the selvedge of the stringer tape within the spaces between the loops 2a, 2b, etc. The loom reed 6 is preferably also provided in the zone of the free loops 2a, etc. with reed teeth 6a which project ahead of the other reed teeth, so that the last loop 2a is pressed hard and as by impact against the end forming member 7 of the structure 7–8 by the reed teeth 6a, which strike before the reed teeth 6. The last loop 2a is thereby provided with a stamped depression 10 acting as a coupling surface and in addition the penultimate loop 2b is provided with a similar stamped depression 10. The production of these stamped depressions 10, 11 may be assisted by the application of heat to soften the filament, or alternatively by the use of chemical softening means. The structure 7–8 is then withdrawn from the zone of the free loops 2a, etc. and the woven fastener tape is advanced through a distance equal to the center spacing between the forming members 7, the loops sliding on the fixed pin 9, so that the subsequent fastener loop may be created by weaving in the plastic weft, the structure 7–8 then being forcibly reinserted into the next series of spaces between the loops for the creation of the subsequent deformations 10, 11 acting as coupling surfaces. This advance of the woven tape is hereinafter referred to as being through an integral multiple of the center spacing distance which includes not only an advance of a single distance which is equal to the distance between adjacent centers, but also includes an advance which is two or more times the center-to-center distance. These steps are cyclically repeated during the weaving. In order to increase the resistance of the forming members 7 acting as abutments, the free ends of the rods may also engage in cooperating holes in a strip (not shown) arranged on the opposite support 8.

Instead of unitary forming members 7 which engage over both parallel legs of the loops 2a, 2b, etc., it is also possible, in the embodiment shown in FIGURES 2 to 4, to use two-part forming members which engage the loops in axial alignment from both sides of the plane of the tape so that the lengths of the individual forming members may be correspondingly reduced.

In this case, the forming members 7a in the example shown in FIGURES 5 and 6 may also be constructed similarly to cog wheel teeth or rack teeth, i.e. teeth with a specific breadth, so that the side surfaces of the teeth 7a may then be positioned against the sides of the parallel legs of the free loops 2a etc. in the gaps or free spaces between the loops 2a in the zone of the fixed pin 9 and also on both sides of the said pin. Deformations 12, 13 (FIG. 6) are then made in the legs of the loops by the impact of the reed, these deformations being in the form of grooves which extend across the legs of the loop to form coupling surfaces, and which are shown in broken hatching. On the mutual engagement of two sliding clasp fastener halves manufactured in accordance with the invention, a particularly good mutual fit and coupling grip is thereby achieved.

In FIGURES 7 to 10, a supporting member 14 with a series of forming members 15 is used, the forming members effecting a reciprocating movement perpendicular to the plane of the stringer tape. In the example, the supporting member 14 with the forming members 15 is vertically slidably mounted between lateral guides 16 and 17 which run parallel to the row of fastener loops 2, 2a, the guide 16 and a corresponding shoulder 16a in a bench or the like guiding the projecting intermediate parts of the fastener members in the zone of the stringer tape 1, while the guide 17 engages the outermost end portions of the free loops 2a. The forming members 15 are reciprocated vertically into and out of the spaces between the teeth in the region which is located between the selvedge of the tape and the inner curve of the free loop 2a. The teeth 15 have a dimension or a diameter, in the direction of the selvage, which is greater than the free space between two adjacent loops. If the forming members 15 are moved downwardly, they will impart deformations in the parallel legs of the free loops 2a by virtue of their dimensions, that is to say, they will form transverse grooves in the legs, so that the grooves then form coupling surfaces for two sliding clasp fastener halves to be engaged with one another. The cross-section shape of the teeth 15 may be circular, oval or even trapezoidal, for example, as has been shown in FIGURE 8. In accordance with the invention, the forming members 15 must be sufficient in number to form a bilateral support for the loops when they are forcibly inserted into the spaces between the loops 2a, and care must be taken that the forming members 15 are also very finely constructed in the case of very fine fasteners. There is a circular reciprocation of the forming members 15 which causes them to advance cyclically by one or more fastener member center-to-center intervals as desired. In accordance with the illustrated embodiment, the advance may be effected by the forming members 15, by virtue of the fact that the supporting member 14 is mounted on two spaced parallel shafts 18, so that when the shafts 18 are eccentrically rotated in unison the teeth 15 engage in the free spaces between adjacent loops and the advance of the stringer tape and loops 1, 2 is effected by the eccentric circular movement.

Lateral displacement of the stringer tape is positively prevented by the two guides 16 and 17 through the entire length of the series of forming members, and if a slight frictional tension is imparted by guides 16 and 17 to the stringer tape and loops 2a the tops of the loops will also be slightly deformed when the forming members enters the spaces. This deformation may be increased by shaping the supporting member 14 to include a depending pressure strip portion 19 which is pressed against the outermost end portions of the loops 2a when the forming members 15 move downwardly, the pressure strip together with the forming members 15 thus achieving a greater flattening of the outermost ends.

Referring to FIG. 12, forming members 15a with cross-sectional configurations of the aforementioned type are fixed to the periphery of each of one of a pair of circular discs 20, 21; the diameter of the discs 20, 21 must be sufficiently large to assure that a series of radially extending forming members 15a will always be engaged in a complementary series of spaces between adjacent loops. The discs 20 and 21 are driven to rotate in opposite directions at equal angular velocities, so that the coupling surface deformations are continuously produced as the forming members pass through a position of axial alignment with each other, accompanied by a continuous advance of the sliding clasp fastener half. The periphery of the discs 20 and 21 is provided with flanges 22, 23 which engage, on the one hand the intermediate portions which project from the stringer tape 1, and on the other hand, the outermost end portions of the loops 2a as a guide for preventing lateral displacement. Additionally, the flanges 22 co-operate with the forming members 15a in deforming the tops of the loops 2a, thereby improving the coupling of two engaged fastener halves.

In the embodiments shown in FIGURES 7 to 11, or in similar embodiments, it is possible to increase the cross-sectional areas of the teeth 15 progressively within the series in the direction of the advance, so that the ultimate deformations which are produced in the legs of the loops 2a will be formed in a succession of stages. The formation of the deformations may be facilitated if desired by heating the structure 14, 15 or by blowing warm air into the zone of operation of the forming members, in order thereby to achieve a slight temporary plastification of the individual loops in order to facilitate the production of the deformations.

As shown in the arrangement of FIGURES 14 and 15, the woven sliding clasp fastener half 1, 2 is guided along a curved path which merges into a straight stretch and thence into another curved path. In the plane of the fastener an endless row of forming members is arranged around two pulleys 24 and 25. This row of forming members consists of an endless helical coil spring 26 formed of metal or other rigid material, the operating height or diameter of the coiled spring being appropriately greater than the free lengths of each loop and the thickness of the spring wire which forms the convolutions being somewhat greater than the free space between two successive loops of the fastener. The coil spring 26 is guided along a straight path between the two pulleys 24 and 25 by a support member so that it cannot be displaced towards the right (as viewed in FIGS. 14 and 15). The curve in the fastener half partly coincides, symmetrically and at the same height, with the curve of the coil spring 26 around the pulley 25, so that the fastener member loops on the one hand and the coil spring convolutions on the other hand become radially divergent and the spacing between their outer end portions is increased, so that as the fastener half and the coil spring run at the same speed, the individual convolutions of the spring engage freely between and mesh with the free fastener member loops and there then results a firm meshing engagement between the loops and the spring convolutions as they pass through the straight guiding stretch. As the thickness of the wire forming the coil spring convolutions is greater than the free space between successive fastener loops, the spring convolutions will impress themselves into the legs of the free loops and thereby form coupling surfaces on said loops. The wire of the coil spring 26 may have a flattened cross-sectional configuration corresponding to the section of the loops. The drive for the sliding clasp fastener half 1, 2 and for the endless coil spring 26 may be effected in any desired fashion. It may prove sufficient simply to pull the fastener half 1, 2 in the direction of the arrow, so that the coil spring 26 is automatically carried with it by virtue of its meshing engagement in the loops, without the necessity for any separate driving means.

In this case, too, the row of loops is guided along the entry curve and along the straight stretch, on a recessed table surface 27 (FIG. 15) opposite which there is a fixed recessed guide 28, the shoulders of the said guides 27 and 28 being applied against the projecting portions of the fastener members at opposite sides of the stringer tape. There can then be no lateral displacement of the tape and loops when the convolutions of the coil spring 26 are engaged.

In a modified embodiment according to FIGURES 16 and 17, the coil spring 26 is replaced by individual loop members 29 fastened to the outer side of an endless belt 30. These belt-carried loops 29 also have cross-sectional dimensions in the longitudinal direction of the tape selvage which are greater than the free space between two successive loops 2 and the belt-carried loops 29 are also constructed in such a manner that the outermost ends of the loops 2 are pressed against the carrier belt 30 as they become engaged between loops 29 at the curved entry side. Displacement of the endless belt 30 away from the loops 2 can be prevented by suitable guides (not shown). In this case, the forming member loops 29 may co-operate with the unyielding endless belt 30 in such a manner that not only the legs of the loops, but also the outermost end portions of the loops are flattened during their engagement with belt-carried loops 29, so that the coupling engagement between two sliding clasp fastener halves thereby enhanced.

Referring to FIGURES 18 to 20, it is possible to use a continuously peripherally slotted or grooved one-piece fixed support 31 with straight sides and curved ends in the place of the endless coil spring or the endless belt 30 with the attached deforming loops 29. The said peripherally grooved support 31 is provided with a continuous peripheral T-shaped guide slot 32, and individual plate-like forming members 33 are inserted in this slot so that they lie adjacent to one another, the forming members projecting out of the T-shaped slot 32 in the carrier support 31 and being provided at their free ends with forming heads 34 of appropriate section. The forming heads 34 have a cross-sectional configuration such that they are larger in the direction of the selvage of the tape 1 than the free space between adjacent loops 2, so that coupling surfaces are impressed in the sides of the legs of loops 2 during the engagement of the row of loops 2, with the forming heads 34. The side surface of the carrier support 31 forms adjacent to the slot 32 an abutment surface for the outermost end portions of the loops 2, which may thus be flattened in co-operation with the deforming head 34. In order to ensure a firm application of the outer ends of the loops 2 against the side surfaces of the carrier support 31, the intermediate portions of the fastener members which protrude from opposite sides of the stringer tape are guided by guide members 35 and 36.

It is also possible, in all the embodiments shown in FIGURES 14 to 20, to fix a wedge-shaped guide block 37 on the curved entry side, as shown in FIGURE 14, the guide block 37 operating in the manner of a conventional sliding clasp fastener slider to guide the loops and the forming members into engagement. While I have shown and described what I believe to be the best embodiments of my invention, it will be apparent to those skilled in the art that various changes and modifications may be made therein without departing from the spirit and scope of the invention as defined in the appended claims.

I claim:
1. The method of shaping free end portions of projecting loops of a continuous permanently deformable plastic filament to form slide fastener teeth on said free end portions, said filament being woven into a stringer tape with inner portions of said projecting loops interwoven with one selvage of the tape, said projecting loops being arranged in a uniformly spaced series along said one selvage with the filament extending transversely with respect to the surface of the stringer tape at the outermost end portion of each loop and extending toward said selvage from said outermost end portion in the form of two spaced parallel leg portions which are generally parallel to said surfaces of the tape, said method comprising the steps of: inserting a plurality of forming members into a first series of free spaces between a plurality of consecutive projecting loops to occupy said spaces simultaneously, the center spacing between adjacent ones of said forming members being the same as the center spacing between adjacent ones of said loops, each forming member being larger in the direction parallel to the selvage than is each free space between adjacent loops; withdrawing at least an end one of said forming members from its position within said first series of free spaces; causing pressure to be applied to at least a loop adjacent to an end one of said forming members intermediate said insertion and withdrawing steps to cause said last-named loop adjacent to its outermost end portion to assume, at least partially, a configuration for fastening cooperation with confronting loops of complementary shape on another stringer tape; and inserting at least one forming member into an end one of a second series of free spaces, said second series of free spaces excluding at least an end free space previously occupied by a forming member, the number of free spaces in said second series being equal to the number of free spaces in said first series, all of the free spaces of said second series having forming members therein after said step of inserting at least one forming member.

2. The method according to claim 1, wherein all of said forming members are inserted and withdrawn simultaneously, said method comprising the further step of causing relative movement between said tape and said forming members through a distance equal to said center spacing, said relative movement being caused after said withdrawing step and prior to the second of said inserting steps.

3. The method according to claim 2, wherein said method is performed during the course of weaving said stringer tape in a loom having a reed, and in which said step of causing pressure to be applied is performed by beating one side of one of said loops against an end one of said forming members concurrently with the action of said reed.

4. The method according to claim 1, wherein each of said forming members comprises two separate portions, said inserting step being performed, in each instance, by approaching said two portions toward each other while maintaining said portions in axial alignment with each other.

5. The method according to claim 1, in which said forming members are arranged in an endless belt configuration, said withdrawing step being performed by withdrawing one forming member from one end of said first series of free spaces.

6. The method according to claim 1, comprising the further step of supporting said outermost free end portions of the loops which are adjacent to said forming members to prevent outward movement thereof away from said selvage during the course of said step in which pressure is caused to be applied.

7. The method according to claim 1, comprising the further steps of simultaneously guiding said stringer tape, said intermediate lengths of said filament and said loops to prevent lateral movement of said stringer tape in any direction; and advancing said tape longitudinally during the course of said method.

8. The method according to claim 1, wherein each of said forming members comprises two separate portions, each portion extending radially outwardly from the periphery of one of a pair of wheels, said withdrawing step and said second inserting step being performed by rotation of said wheels in opposite directions at equal angular velocities accompanied by the bringing of said two portions of each deforming member into axial alignment with each other once during each revolution of said wheels, said pressure applying step being performed with said two portions in axial alignment and with their free ends in close proximity to each other.

9. The method according to claim 1, in which said forming members are constituted by a series of convolutions of an endless spiral spring which is arranged to travel in a planar path comprising two curved portions and a straight portion intermediate said curved portions, said withdrawing step being performed by disengaging said loops and said convolutions at one of said curved portions and said second inserting step being performed at the other curved portion, said step of causing pressure to be applied being performed in said straight portion with said convolutions in meshing engagement with said loops.

10. The method according to claim 1, wherein both of said inserting steps are performed by cyclical simultaneous reciprocatory movement of all of said forming members perpendicularly with respect to the surfaces of said tape, said method comprising the further step of cyclically advancing said tape through a distance equal to an integral multiple of said center spacing intermediate said withdrawing and said inserting steps of each cycle.

References Cited in the file of this patent
UNITED STATES PATENTS

| 2,696,846 | 12/1954 | Libby | 139—291 |
| 2,907,066 | 10/1959 | Wahl | 18—12 |
| 3,022,803 | 2/1962 | Berberich et al. | 139—384.2 |

FOREIGN PATENTS

| 1,230,147 | 3/1960 | France. |
| 1,232,000 | 4/1960 | France. |

DONALD W. PARKER, *Primary Examiner.*

RUSSELL C. MADER, H. S. JAUDON,
*Assistant Examiners.*